United States Patent [19]

Feather

[11] 4,412,924
[45] Nov. 1, 1983

[54] WATER PURIFICATION SYSTEM

[76] Inventor: Orval R. Feather, 2464 Bunker Hill, Ann Arbor, Mich. 48105

[21] Appl. No.: 335,536

[22] Filed: Dec. 29, 1981

[51] Int. Cl.³ .............................................. C02B 1/10
[52] U.S. Cl. .................................... 210/744; 210/760; 210/123; 210/218; 55/53; 55/196
[58] Field of Search .............. 210/760, 744, 123, 218, 210/222, 223, 519; 55/38, 53, 196

[56] References Cited

U.S. PATENT DOCUMENTS

| | | | |
|---|---|---|---|
| 2,811,258 | 10/1957 | Schleyer et al. | 210/218 X |
| 3,070,935 | 1/1963 | Deleon | 55/196 |
| 3,382,980 | 5/1968 | Silva | 210/123 |
| 3,421,625 | 1/1969 | Fritz | 210/101 |
| 3,445,001 | 5/1969 | La Raus | 210/98 |
| 3,448,045 | 6/1969 | Hess et al. | 210/63 |
| 3,517,814 | 6/1970 | Minegishi | 210/519 X |
| 3,685,656 | 8/1972 | Schaefer | 210/195 |
| 3,784,008 | 1/1974 | Troglione | 210/104 |
| 3,823,728 | 7/1974 | Burris | 210/760 X |
| 4,148,731 | 4/1979 | Brigante | 210/233 |

FOREIGN PATENT DOCUMENTS

| | | | |
|---|---|---|---|
| 2935189 | 3/1981 | Fed. Rep. of Germany | 210/760 |
| 4956453 | 9/1972 | Japan | 210/760 |
| 11639 | of 1909 | United Kingdom | 55/196 |

Primary Examiner—John Adee
Attorney, Agent, or Firm—Beaman & Beaman

[57] ABSTRACT

The invention pertains to a method and apparatus for processing contaminated water containing high concentrates of volatile and soluble inorganic and organic compounds and ion reaction complexes thereof, and particularly pertains to the removal of high concentrations of hydrogen sulfide from well water, and the invention is well suited for use with domestic water systems. Batches of untreated water are introduced into a vented first holding chamber at a rate and volume related to the removal of batches of treated water from a second holding chamber. The chambers are interconnected by a dilution flow control orifice, or orifices, and air and ozone are mixed with the water within both chambers wherein aeration by air-stripping within the first chamber rapidly reduces the high hydrogen sulfide concentration and the lower hydrogen sulfide content of the water within the second chamber is primarily removed by the ozone. Effective ozonization within the second chamber is assured by stratifying the second chamber water by producing a vortex therein, and the rate of dilution of the water within the first chamber as it is transferred into the second chamber is controlled by the dilution flow control orifice.

14 Claims, 3 Drawing Figures

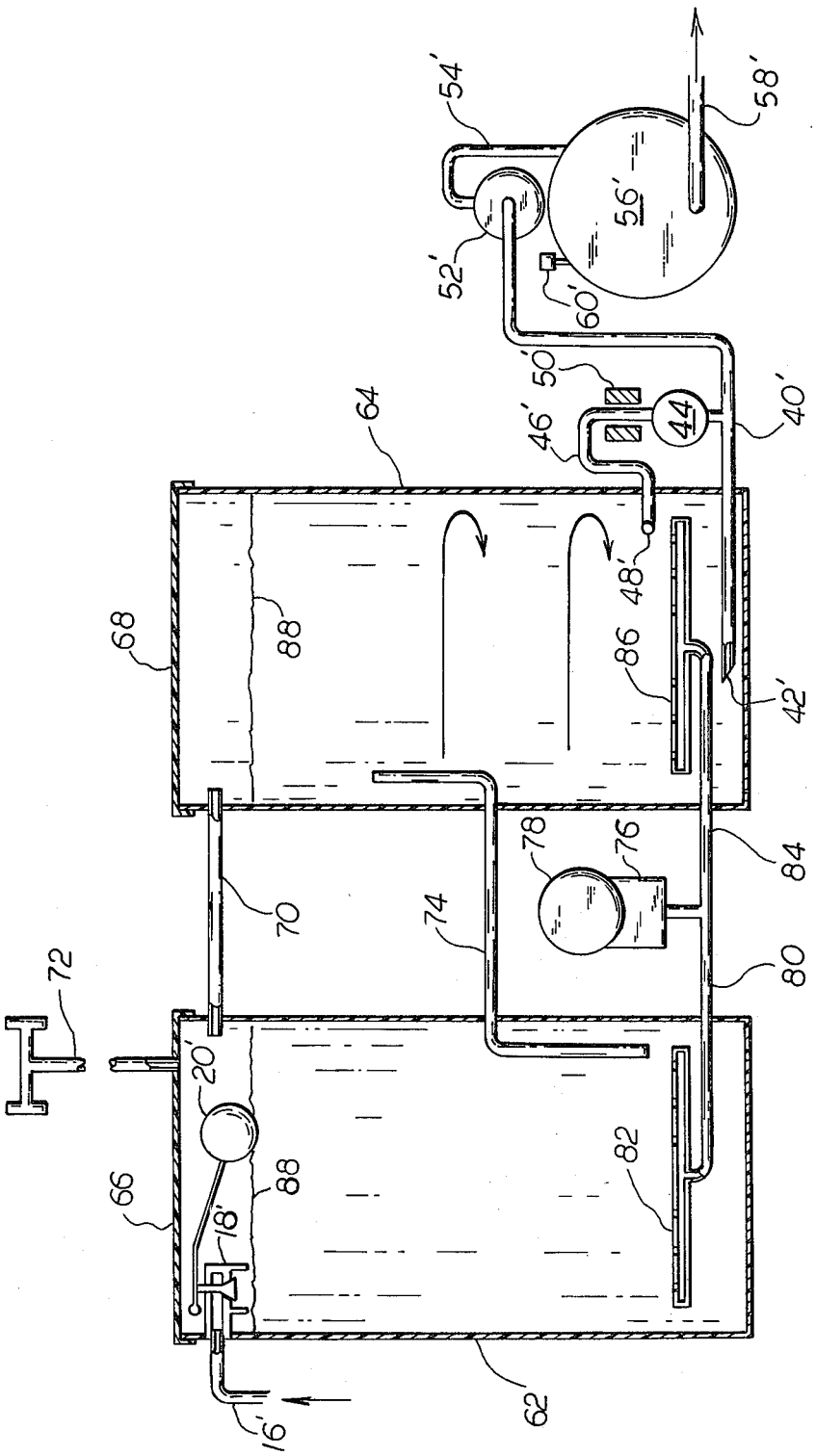

WATER PURIFICATION SYSTEM

BACKGROUND OF THE INVENTION

Well water, particularly water drawn from "deep" wells below thirty feet often contains high quantities of mineral derived organic dissolved solids and soluble gases, low quantities of soluble organics, and high quantities of numerous ion-complexes of the foregoing. It is not uncommon for deep water wells to contain soluble hydrogen sulfide gas, and the presence of hydrogen sulfide is serious due to the unpleasant odor, high corrosivity and toxicity.

Hydrogen sulfide concentrations within well water increase dramatically, up to five or more times normal, as atmospheric pressures decrease even as little as one percent. As the atmospheric air pressure falls, the lower level ground water at high pressure releases its higher concentrations of dissolved hydrogen sulfide which is transported to and concentrates at the higher level locations where the deep well water is removed. Accordingly, the concentration of hydrogen sulfide within well water can fluctuate widely rendering treatment difficult.

Further, due to the increasing demand for ground water the water table levels have fallen in many localities causing the hydrogen sulfide contamination to increase. Hydrogen sulfide contamination of well water is becoming increasingly prevalent. The release of hydrogen sulfide from a domestic water system can create serious human toxicity problems within confined areas such as showers and bathrooms. Even low levels of hydrogen sulfide in air reacts with copper and many other metals to corrode water pipe plumbing fixtures, electrical wiring and switches, electrical equipment and the like. The unpleasant odor of hydrogen sulfide can be detected by humans at levels as low as 0.0001 mg/l.

As the contaminants within well water vary according to locale, a variety of water processing systems are available, either for commercial or domestic use; but conventional systems will not successfully treat the broad range of specific water processing requirements needed for multiple contaminant removal, especially where the contaminant levels are high. Zeolite water softeners are widely used to control water hardness but water softeners are not effective for removing hydrogen sulfide. Potassium permanganate treated "green sand" systems are used for treating well water requiring limited oxidation treatment. While such a system can treat a higher concentration of hydrogen sulfide than a conventional zeolite water conditioning process the hydrogen sulfide treatment capacity is limited by concentrations to approximately 3.0 mg/l. Potassium permanganate is recognized as being very toxic, and, at times, it is dangerous to handle.

Chlorination systems are often employed for the treatment of well water containing hydrogen sulfide, and such systems can be effective for sulfide concentrations as high as 15 mg/l. However, the addition of chlorine to water systems can be dangerous, especially to children, and chlorine overdosing must occur to insure that stoichiometric requirements are exceeded to insure that widely varying incoming contaminant levels are fully treated. This excess chlorine must then be removed by using activated carbon filters to prevent objectionable chlorine taste and odors, and chlorine chemically combines with organic residuals of fulvic and humic acids, tannins and inorganic ions of iron and manganese to form intermediate chemical compounds which produce unacceptable odors, tastes and colors which the activated carbon filters cannot remove. The metering pumps required in a chlorine system are subjected to high rates of corrosion and require continuous maintenance and frequent replacement. While the chlorine treatment of water for hydrogen sulfide may produce a water quality satisfactory for bathing and laundry uses, it is normally considered unpotable by users.

The gas transfer process air-strips volatile gases from water using water spray aeration and fine air bubble aeration. Aeration is highly effective for removing high levels of hydrogen sulfide, but becomes increasingly ineffective at lower levels. Tests of aeration systems, such as a fine air bubble air-stripping process, show that water containing over 130 mg/l of hydrogen sulfide can be reduced to 55 mg/l within fifteen minutes. However, an additional two hours is required to reduce hydrogen sulfide to approximately 20 mg/l, and another hour is required to reach a concentration of 7.5 mg/l, and further extended aeration treatment will not lower the concentrations below 2.5 mg/l, an unacceptably high level for a domestic water system.

Ozone oxidation has been recognized as an effective water purification process and has been employed in the treatment of sulfides. Ozone has been employed in commercial and municipal high volume water treatment systems, but has not been practical for use with domestic water systems. A number of U.S. patents are directed to systems utilizing ozone in the treatment of domestic water, but the apparatus previously proposed has not been capable of effectively treating high volumes of water containing high concentrations of hydrogen sulfide ranging to 130 mg/l and higher, and prior art water treatment systems have not proven practical for various reasons. Prior art ozonization water treatment systems, like municipal systems, have all been designed to perform oxidation on a high rate stoichiometric process basis. Thus, as incoming contaminants vary widely in ozone demand requirements and water usage demands vary widely in peak-load requirements, ozone generator capacities must match or exceed these requirements if a "breakthrough" is to be prevented. Generator costs are in the range of approximately $1000.00 per ozone gram per hour output and such equipment is expensive and operating inefficiencies are numerous.

Sylva, U.S. Pat. No. 3,382,980, discloses an ozone water treating system wherein a motorized agitator is employed to intermix ozone and air with the water. This system has a low capacity of water treatment, and is expensive to operate in view of the requirement for a relatively large agitation motor.

In LaRaus, U.S. Pat. No. 3,445,001, compressed air and ozone are injected into a pressurized water tank wherein the water is treated to both ozonization and air-stripping, but as the tank is pressurized, high partial gas pressures within the tank prevent satisfactory air-stripping. The apparatus shown in this patent is not capable of effectively removing high peak-load concentrates of hydrogen sulfide at the domestic water volumes required of existing well water systems.

Hess, U.S. Pat. No. 3,448,045, discloses a water treatment system utilizing compressed air and ozone wherein treatment of the water occurs within a circuitous conduit and the treated water is stored for use as desired. Ozonization and air-stripping occurs simultaneously at the same location, and the levels of hydrogen sulfide capable of being removed are limited, and the system has a low capacity.

A two tank liquid treatment system utilizing ozone is shown in the patent to Schafer, U.S. Pat. No. 3,685,656, wherein the treatment of industrial oils is contemplated within vented tanks. The system disclosed in this patent is too complex for domestic water treatment systems.

Troglione, U.S. Pat. No. 3,784,008, discloses ozonating apparatus utilizing a vented tank. This apparatus is used to produce limited quantities of drinking water, and ozone is used for the purification treatment and treated water is removed from the treatment tank by a pump for storage within a pressurized compartment. The apparatus shown in this patent is capable of only purifying small quantities of water for drinking purposes, and is not practical for use in treating all of the water requirements of a domestic water system.

SUMMARY OF THE INVENTION

It is an object of the invention to provide a method and apparatus for purifying the water of a domestic water system wherein high concentrates of hydrogen sulfide exist and concentrates in excess of 130 mg/l of hydrogen sulfide can be removed from over 400 gallons of water per day at normal household demand rates.

A further object of the invention is to provide a practical method and apparatus for treating the water of domestic water systems wherein hydrogen sulfide concentrates in excess of 130 mg/l can be removed from over 400 gallons per day at normal water demand rates, and wherein the process and apparatus is relatively inexpensive and concise, is feasible for domestic installation and use, and requires a minimum of maintenance and attention.

An additional object of the invention is to provide a water purification system for removing high concentrates of hydrogen sulfide wherein the water is treated in at least two separated chambers which can contain water having a range from high to low hydrogen sulfide concentrates, respectively, and may actually have no hydrogen sulfide therein, and wherein the flow of water from the high concentration chamber to the low concentration chamber is controlled by dilution control means, and a high rate of hydrogen sulfide removal occurs within the high concentration chamber primarily due to air-stripping aeration, and low levels of hydrogen sulfide are removed in the second chamber primarily by ozonization and oxidation.

Another object of the invention is to provide a water purification system utilizing at least two chambers containing high and low hydrogen sulfide concentrations, respectively, wherein the chambers are interconnected and flow of contaminating water from the high concentrate chamber to the treated water of the low concentrated chamber is controlled, and wherein ozonization within the low concentrate chamber is controlled and improved by stratifying the water within this chamber by producing a vortex.

An additional object of the invention is to provide a water purification system utilizing atmospheric vented water receiving chambers wherein ozone and air are introduced into the lower regions of the chambers at low pressures and operating costs of the system are minimized.

Yet another object of the invention is to provide a water purification system of relatively high volume water treatment and storage capacities wherein raw water and treated compartments are utilized, aeration for the air-stripping of volatiles is present, a controlled dilution flow rate of water from the raw water chamber to the treated water chamber takes place, both dissolved oxygen and ozone oxidation of the water is provided, and the water is also subjected to a magnetic field for sediment and scale control while horizontal vortexing of the water within the treated water compartment is utilized to aid ozonization and produce water stratification.

Another object of the invention is to provide a water purification system utilizing a plurality of water holding chambers containing raw and treated water, respectively, and wherein the flow of water between the chambers is matched to processing capacities, and the removal of water from the treated water chamber is at predetermined volumes which determine the rate at which raw water is introduced into the system.

A further object of the invention is to provide a water purification system for domestic use for removing high hydrogen sulfide concentrates wherein the water within the system is stored within atmospheric vented chambers and the water within the chambers is exposed to air and ozone for treatment, water is removed from the purification system periodically, in predetermined volumes, and the treatment of the water is continuously occurring both during and between withdrawal of treated water.

In the practice of the invention raw well water containing hydrogen sulfide is introduced into a first tank chamber which is vented to the atmosphere. The inlet water is usually controlled by a float operated valve. A second tank chamber in communication with the first chamber contains treated water which is periodically removed by a pump pressurizing a water storage tank with a predetermined volume of water, and as the water is removed from the treated chamber a like volume is introduced into the raw water chamber through the float operated valve.

The raw and treated water chambers are in communication through dilution flow control means which controls the rate that the treated water chamber is contaminated by the water flowing therein from the raw water chamber. Preferably, the water within the treated chamber is stratified by a vortex water movement within the chamber produced by a recirculating system including a small pump, and the recirculated water is exposed to a magnetic field which treats the water, decreases its scale formation tendencies, and aids in the control of iron, calcium and manganese.

The chambers for the raw and treated water may be defined within a common tank, or in separate tanks. When located in a common tank the raw water chamber comprises an upper chamber located vertically above the treated water chamber, and the dilution control means comprises a partition or plate within the tank defining the upper and lower chambers and having orifices defined therein which regulate the upward flow of the ozone and air from the lower chamber to the upper and permit water to flow from the upper to the lower chamber. When two separate tanks are employed, the tanks are mounted side by side and interconnected by a conduit having a diameter or orifice of predetermined size wherein the rate of flow from the raw water chamber to the treated water chamber is regulated.

Treatment of the water within the chambers is through the introduction of ozone and air thereinto.

Thus, an oxidation and ozonization occurs which oxidizes the hydrogen sulfide, and simultaneously, an aeration or air-stripping occurs which removes the hydrogen sulfide from the water by gas transfer. The reduction of the high concentrates of hydrogen sulfide from its uppermost levels, i.e. 130 mg/l, to significantly lower levels approaching 5 mg/l primarily occurs within the raw water chamber due to air-stripping aeration. The final removal of the hydrogen sulfide, or "polishing" of the water, occurs within the treated water chamber wherein the hydrogen sulfide level is lowered to zero. In a single tank system, the ozone and air are introduced at the lower region of the lower or treated water chamber, and the ozone and air within this chamber is recirculated in a manner to produce a vortex which stratifies the water and aids ozonization and minimizes the likelihood of hydrogen sulfide reaching the chamber outlet. The ozone and air tends to collect immediately below the dilution control plate and pass into the upper raw water chamber through the orifices defined in the plate. The air and ozone passing through the upper chamber causes agitation of the water therein subjecting the raw water to an effective aeration air-stripping, and as the water within the upper chamber contains high concentrates of hydrogen sulfide the majority of the soluble hydrogen sulfide is removed by the air-stripping occurring within the upper chamber.

In a two tank system ozone and air are preferably simultaneously supplied to both the raw and untreated water chambers. Due to the high concentration of hydrogen sulfide within the raw water chamber the aeration and air-stripping occurring within this chamber significantly reduces the hydrogen sulfide concentration, and as the ozone and compressed air are also introduced into the lower region of the treated water chamber a limited degree of hydrogen sulfide is removed therein by air-stripping. However, in the treated water chamber the lower concentration of hydrogen sulfide received therein, 5 mg/l and below, is reduced to zero and the primary process occurring within the treated water chamber is the ozonization of the water therein to remove the final traces of hydrogen sulfide.

The domestic water system is supplied by a conventional pump and pump storage tank pressurized by the pump, and the pump draws its water from the treated water chamber. As a predetermined volume of water is required to repressurize the storage tank, for instance, about six gallons, a like volume of water will be introduced into the raw water chamber to replace that drawn from the chambers. The dilution control means will regulate the rate that the treated water is contaminated by the water within the raw water chamber, and it is to be appreciated that control of the hydrogen sulfide concentration occurs due to three factors, i.e. (1) primarily by aeration air-stripping within the raw water chamber, (2) primarily by ozonization and oxidation within the treated water chamber, and (3) controlling the rate of contamination of the treated water by the aerated water in the raw water chamber by the dilution control orifices or conduit. As the ozone and air are introduced into the chambers continuously, while the water is removed from the treated water chamber only intermittingly upon demand, the treatment duration of the water within the chambers is usually sufficient to reduce the hydrogen sulfide level within both chambers to low levels, and the treated water chamber will have a zero hydrogen sulfide content at its outlet. This continuous operation of the ozone and air treatment permits a low capacity ozone generator and air compressor to be used, and the fact that the chambers are vented to the atmosphere permits a low pressure air compressor to be employed, and as the vented chambers result in lower vapor pressures within the soluble gases entrapped within the water the aeration and air-stripping treatments are more effective than in a pressurized system.

As the water within both chambers is preferably being continuously treated by ozone and air-stripping the dissolved oxygen and dissolved ozone within the water increases as the hydrogen sulfide content decreases. Thus, during times of low water usage, and at night, the hydrogen sulfide content within both chambers will be very small and the dissolved oxygen and dissolved ozone levels within the water within both chambers significantly increases. Thus, under these circumstances the water becomes a reservoir for dissolved oxygen and dissolved ozone which is capable of very rapidly removing hydrogen sulfide from raw water introduced into the raw water chamber. In effect, this "reservoir" of dissolved oxygen and ozone improves the capacity of the system to absorb hydrogen sulfide as raw water is introduced in batches permitting high hydrogen sulfide concentrates to be rapidly removed.

A small recirculation pump recirculates the water within the treated water chamber to create a horizontal vortex therein. The water molecules within the vortex rotate within the treated water chamber in substantially horizontal planes producing a stratified condition. This stratification of the water within the treated water chamber resists the vertical vortex tending to be created by the upward movement of ozone and air through the treated water chamber, and accordingly, the vortex water movement insures that the ozone and air passing upward therethrough will be well mixed with the water without producing water currents which adversely affect intermixing.

The stratification of the water within the treated water chamber as produced by the vortex also has the advantage of minimizing the likelihood of hydrogen sulfide tainted water from leaving the treated water chamber. The treated water chamber outlet is located at the bottom of the chamber, and the water passing from the raw water chamber to the treated water chamber is introduced at the upper region of the treated water chamber. As the vortex stratifies the water within the treated water chamber a maximum travel distance exists for the hydrogen sulfide to move from the upper chamber region to the outlet, and this movement is counter to the upward flow of ozone and air. Accordingly, stratification insures that the "purest" water will be at the lower region of the treated water chamber, and the stratification discourages rapid dispersal of hydrogen sulfide throughout the treated water chamber.

The vortex further has the advantage of causing any sediment produced within the treated water chamber to collect at the central region of the chamber bottom. Preferably, the outlet conduit inlet is located at this central region wherein sediment may be removed from the chamber during cycling of the pressurizing pump, and such sediment may be filtered from the water system at a subsequent location.

BRIEF DESCRIPTION OF THE DRAWINGS

The aforementioned objects and advantages of the invention will be appreciated from the following description and accompanying drawings wherein:

FIG. 3 is an elevational view, primarily in section, illustrating a two tank embodiment of the invention.

DESCRIPTION OF THE PREFERRED EMBODIMENTS

Figure 1:
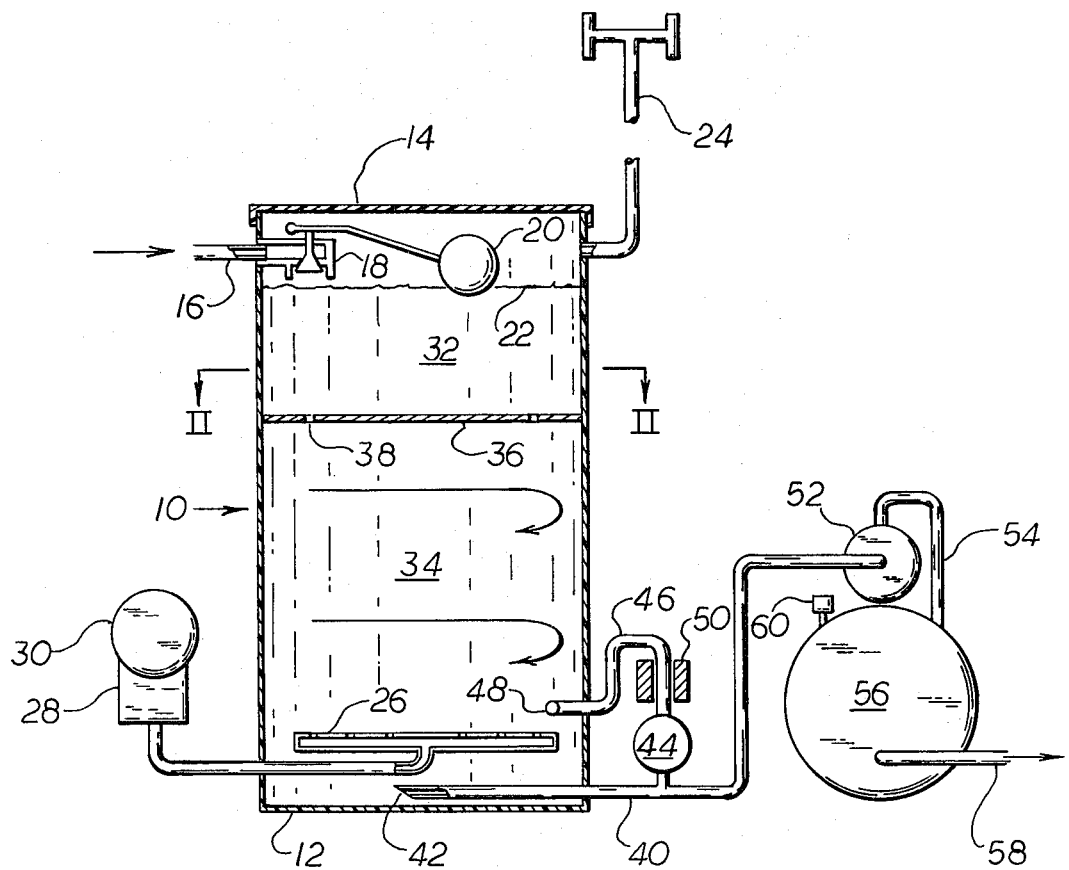
FIG. 1 is a combination sectional and elevational view of apparatus practicing the method of the invention in a one tank embodiment.

In FIG. 1 a single tank embodiment for practicing the inventive concepts is illustrated, and in FIG. 3 a two tank embodiment is shown. In both embodiments the basic concepts of the invention are the same, and it is to be appreciated that both embodiments are equally capable of removing high concentrates of hydrogen sulfide from water. The two tank embodiment of FIG. 3 is of particular advantage in high peak load usage installations having very high hydrogen sulfide concentrations.

While the invention is primarily concerned with the removal of hydrogen sulfide from well water for domestic use, it is to be appreciated that the practice of the invention also removes a variety of volatile and soluble gases and compositions from the water, and the invention is helpful in treating a variety of objectionable water conditions in addition to solving hydrogen sulfide problems.

A typical single tank installation is illustrated in FIG. 1. The cylindrical tank 10 is preferably of a fiberglass material, but may be formed of other long lasting relatively inert material which will not be corroded by hydrogen sulfide. The tank includes a bottom 12, and the upper end is closed by a removable cover 14. A raw water inlet conduit 16 communicates with the upper region of the tank 10 extending through the side wall thereof, and water flow through the conduit into the tank is controlled by a valve 18 operated by float 20 such that the float maintains a relatively constant water level within tank 10 as represented at 22. The upper region of the tank is vented to the atmosphere through vent pipe 24, which will normally extend through the roof of the dwelling.

A diffuser or manifold for distributing ozone and compressed air into the lower region of the tank 10 is represented at 26, and the diffuser communicates with a combination ozone generator 28 and air compressor 30. The ozone generator 28 is preferably of the ultraviolet type, and is of a relatively limited capacity and need only produce approximately one quarter gram per hour of ozone. The air compressor 30 associated with the ozone generator is also of a conventional type, such as of a diaphragm construction, and need only produce approximately ten pounds per square inch pressure wherein the compressed air travels through the ozone generator such that the ozone and air supplied to the diffuser 26 for introduction into the lower region of the tank 10 is only under enough pressure to overcome the water head pressure.

Figure 2:
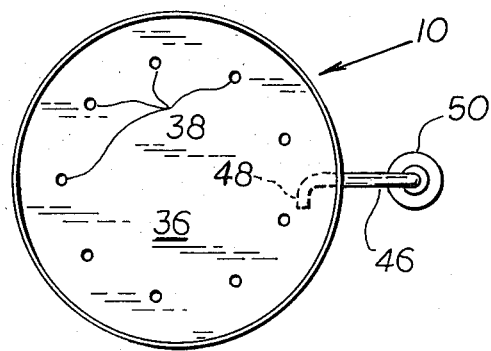
FIG. 2 is a plan, sectional view illustrating the dilution plate as taken along Section II—II of FIG. 1.

The tank 10 is divided into an upper chamber 32 and a lower chamber 34 by the dilution flow control plate 36 horizontally disposed within the tank. The dilution plate 36 includes a plurality of relatively small orifices 38, FIG. 2, located relatively close to the tank and it will be appreciated that the dilution plate is located within the tank 10 such that the volume of the upper chamber 32 is approximately ¼ the volume of the lower chamber 34.

Water is removed from the lower chamber 34 by outlet conduit 40 having an inlet 42 disposed at the center of the tank bottom 12. The outlet conduit 40 communicates with a small recirculation pump 44, and the output of the pump 44 passes through the conduit 46 communicating with the interior of the lower chamber 34. The conduit 46 is provided with a 90° elbow 48, FIG. 2, whereby the water discharged therethrough is tangentially related to the configuration of the tank 10 and creates a vortex movement of water within the lower chamber 34. The conduit 46 is preferably formed of a nonmagnetic synthetic plastic material, as may be all of the disclosed conduits, and a permanent magnet 50 is preferably located adjacent the outlet of the pump 44 adjacent the conduit 46 wherein the recirculated water is exposed to a magnetic field. The exposure of water to a magnetic field has been found to have beneficial results, such as explained in U.S. Pat. No. 4,151,090, and reduces the tendency for the water to scale within conduits, and improves softness and iron removal characteristics.

The outlet conduit 40 also communicates with the pump 52 having an outlet 54 communicating with the pressure storage tank 56, and the storage tank includes an outlet conduit 58 which supplies the water system utilizing the treated water. The outlet conduit 58 may communicate with a filter, water softener or other subsequent water treating means, not shown. The operation of the pump 52 and pressure storage tank 56 is conventional in that an electric pressure switch 60 senses the pressure within the tank 56 and energizes the pump 52 upon the pressure within tank 56 reaching a predetermined minimum, such as 30 psi. Upon the pump 52 being energized and drawing water from the chamber 34 through conduit 40 sufficient water is supplied under pressure to the tank 56 to increase the pressure to 50 psi, for example, and the pump operation is terminated. In a typical domestic system approximately 6 gallons of water may be pumped during the cycle of operation of pump 52.

In operation, the ozone generator 28 and air compressor 30 preferably operate continuously as does the recirculating vortex pump 44. Thus, ozone and compressed air are released into the lower treated water chamber 34 by the diffuser 26. The operation of the recirculating pump 44 causes a vortex within chamber 34 as indicated by the arrows, and this vortex will cause a rotation of the water within the chamber of 8 rpm, or less. This vortexing is in a horizontal direction due to the horizontal tangential orientation of the elbow 48, and the vortex will produce a horizontal stratifying of the moving water molecules within chamber 34. The rising air and ozone from diffuser 26 passes through the stratified vortex, and the vortex produced by the recirculating pump 44 will prevent a vertical water movement or vortex as would normally be produced by the upward movement of the ozone and air. As all of the water being recirculated is exposed to the magnetic field of magnet 50 an effective magnetic field treatment of the water within chamber 34 is attained.

The air and ozone within treated water chamber 34 tend to collect on the underside of the dilution plate 36, and will bubble upwardly through the orifices 38. This upward movement of the air and ozone through the water within upper chamber 32 causes an aeration by air-stripping of the raw water, and a considerable turbulence is produced within the chamber by the rising air. The hydrogen sulfide and other soluble gases stripped from the water within chamber 32 by the air passing through the dilution plate collects in the upper portion of the tank 10 below cover 14 and a cap of ozone and air is created which is vented to the atmosphere through vent pipe 24. Thus, the odors and gases released from the water are carried off to the atmosphere through the vent at rooftop level, and will not be objectionable to the occupants of the dwelling.

Of course, during most of the time, water is not being withdrawn from the treated water chamber 34 by the pump 52 and an effective air-stripping is continuously occurring within the chamber 32 capable of reducing hydrogen sulfide concentrations as high as 130 mg/l to 5 mg/l or less, and within the treated water chamber 34 the ozonization occurring is capable of reducing the hydrogen sulfide concentration to zero. During low water use requirements, the continuous treatment of the water within chambers 32 and 34 produces a reservoir of water having high dissolved oxygen and ozone content. Such water is capable of rapidly removing hydrogen sulfide once raw water is introduced into chamber 32, and this "reservoir" of water capable of producing rapid oxidation and ozonization is one of the reasons that the apparatus of the invention is capable of successfully removing very high hydrogen sulfide concentrates with relatively concise apparatus.

Upon the tank 56 requiring water because of low pressure the pump 52 will be energized drawing water from the tank 10 through conduit 40. This requirement for water is drawn from the chamber 34, and causes water to flow from the chamber 32 to the chamber 34 through the orifices 38. It is to be appreciated that transfer of water from chamber 32 to chamber 34 is counter to the upward flow of air and ozone through the orifices 38, and this counter flow produces an effective air-stripping at the orifices. Approximately six gallons of water are drawn from the lowermost region of the chamber 34 during each cycle of pump 52, and the operation of the pump 52 will cause six gallons of water to pass through dilution plate 36 from chamber 32 to chamber 34. Usually, this transfer of water between the chambers will introduce limited amounts of hydrogen sulfide into chamber 34. However, this hydrogen sulfide within chamber 34 is quickly acted upon in several respects. First, the hydrogen sulfide is reduced in concentration due to the increased volume of chamber 34 and the dilution aspect that occurs. Secondly, assuming that a duration of time has occurred since the last operation of pump 52, the water within chamber 34 has a stored ozone and oxygen content which immediately begins acting upon the hydrogen sulfide to remove the same from the water within chamber 34. Thirdly, the stratification of water within chamber 34 produced by the vortex water movement prevents rapid dispersal of the hydrogen sulfide throughout the chamber 34 and provides adequate time for the hydrogen sulfide to be ozonated and oxidized. Accordingly, water reaching the lowermost region of the chamber 34 as to enter outlet conduit 40 has been exposed to maximum treatment, and all of the hydrogen sulfide has been removed from the water entering pump 52.

The air and ozone collecting within the tank space below cover 14 creates an ozone "cap" over the water surface, which provides an ozone disinfection control protecting the water from contamination and excess pressure created at this location will be vented.

By way of example, a typical tank 10 is approximately 50 inches in height, 24 inches in diameter, and is of a 100 gallon capacity. The chamber 32 may contain approximately 18 gallons of water, while chamber 34 contains approximately 70 gallons, and an approximately 12 gallon air chamber exists below cover 14. As previously discussed, air-stripping by aeration is most effective when the hydrogen sulfide concentrations are high, and by keeping the volume of chamber 32 relatively small a relatively high hydrogen sulfide concentration will exist in chamber 32 upon each batch introduction of raw water. Over extended operation of the ozone generator and air compressor residual ozone rising through the orifices 38 instantly oxidizes residual low level hydrogen sulfide within chamber 32, and during times of low water demand the hydrogen sulfide level within chamber 32 will become very low.

The dilution plate 36 primarily serves to separate and define chambers 32 and 34. Thus, the dilution plate will confine the high hydrogen sulfide concentrated water to chamber 32, and confine the treated water to chamber 34. The dilution plate 36 may take the form of a fine screen, or other member which is pervious to air and ozone moving upwardly therethrough, and also permits water to flow downwardly. However, the dilution plate 36 must not be so pervious as to permit the water within chambers 32 and 34 to readily intermix.

From the above, it will be appreciated that hydrogen sulfide concentrations within the well water being supplied to the tank 10 are reduced by the air-stripping occurring within chamber 32, the ozonization oxidation and air-stripping occurring within the chamber 34, and the dilution of the hydrogen sulfide concentrations as the water passes from chamber 32 to chamber 34 through the dilution plate 36. The disclosed apparatus, in addition to effectively removing hydrogen sulfide from well water, also aids in lowering methane concentrations, and reduces iron, maganese and ion reactive complexes within the water. As only a low capacity ozone generator, and low pressure air compressor are required, and as a relatively small recirculating pump 44 will produce the desired vortexing action, the energy requirements are moderate.

The two tank embodiment of FIG. 3 utilizes the same basic concepts as the previously described apparatus and equivalent components are designated by primed reference numerals. In FIG. 3 indentically sized tanks 62 and 64 of 100 gallon capacity are located adjacent each other, the tanks are each of a cylindrical configuration, and tank 62 is enclosed by removable cover 66, while tank 64 includes cover 68. The upper regions of the tanks are interconnected by conduit 70, and the upper region of the tank 62 is vented to the atmosphere through vent conduit 72 which communicates with the upper region of the tank 62 either through the cover 66, as shown, or through the tank side wall. The vent conduit 72 preferably extends through the roof of the dwelling being serviced.

Untreated raw water is introduced into the tank 62 through inlet conduit 16', and the flow through the conduit is controlled by valve 18' which is operated by float 20' to maintain a predetermined water level within tank 62. The tanks 62 and 64 are interconnected by dilution control conduit 74 which passes between the tanks, and is of a Z-configuration wherein the inlet of the conduit 74 is located adjacent the lower region of the tank 62, while the outlet of the conduit within tank 64 is disposed upwardly adjacent the upper regions of the tank. The diameter of the dilution control circuit 74 is such to control the rate of flow from tank 62 to tank 64, and such rate of flow is restricted to prevent too high a rate of contamination of the water within tank 64 from tank 62. The exact diameter of the conduit 74, or the control orifice located therein, will be dependent upon the size of the tanks, the quantity of ozone and air supplied to the tanks, and similar factors.

Ozone and air is supplied to the lower region of both tanks 62 and 64. The ozone generator 76 and air compressor 78 are connected by conduit 80 to a diffuser 82 located within tank 62, and conduit 84 supplies the diffuser 86 in tank 64. The diffusers are of such configuration as to uniformly distribute the ozone and air over the lower region of the tanks, and the rising ozone and air in tank 62 will cause a vertical vortex which aids aeration in tank 62. As in the previous embodiment, the ozone generator 76 is preferably of the ultraviolet type, and the air compressor 78 is of the low pressure diaphragm type.

Water is extracted from the bottom of the tank 64 by outlet conduit 40' having an inlet 42' located at the center of the tank. As in the previous embodiment, a recirculating pump 44' communicates with the conduit 40', and includes an outlet which extends through the permanent magnet 50' and water is discharged into the tank 64 at an angle to create a vortex within the tank.

The pressure pump 52' is supplied through conduit 40' and communicates with the storage tank 56', and the pump pressurizes the water storage tank in the known manner. Pressure switch 60' controls the operation of pump 52' in accord with the pressure within tank 56', and the water supply conduit 58' may be connected to a filter, water softener, or other apparatus, not shown, utilized with the water system.

In operation, the raw well water is introduced into the tank 62 through conduit 16' and valve 18', and the water level 88 will be identical in both tanks due to the interconnection via conduit 74. Ozone and air are continuously supplied to the diffusers 82 and 86, and as the tanks are vented only low air pressures are required to supply the diffusers. The ozone and air bubbling up through the tank 62 rapidly lowers the concentration of hydrogen sulfide due to aeration by air-stripping. Of course, some of the hydrogen sulfide will be treated by the ozone, and the hydrogen sulfide concentrate within tank 62 adjacent the lower end of dilution control conduit 74 will be as low as 5 mg/l, for instance, even though the hydrogen sulfide concentration of the raw water is as high as 130 mg/l.

As the water within tank 64 has been received from the lower region of the tank 62, the hydrogen sulfide content within tank 64 is very low, even adjacent the upper regions of the tank, and the ozone and compressed air introduced into tank 64 through diffuser 86 will "polish" the water therein and lower the hydrogen sulfide to zero at conduit inlet 42' rendering the water potable and fully treated. While a minor portion of the hydrogen sulfide within tank 64 will be removed by air-stripping, primarily, purification is due to the reaction of the hydrogen sulfide with the ozone, and this ozonization will rapidly lower the hydrogen sulfide content.

The vortex created within tank 64, as indicated by the arrows, will cause a stratification of the water within the tank, and produce the same advantages are previously described with respect to chamber 34. As the water being transferred from tank 62 is removed adjacent the lower regions of the tank, and is transferred to the upper region of tank 64, a relatively long flow path exists between water introduced into tank 64 and the conduit inlet 42', and the stratification of water within tank 64 will insure that all of the water entering conduit 40' will have its hydrogen sulfide removed.

As water is required to supply the tank 56', the pump 52' will be energized and draw water from the bottom of the treated water tank 64. Of course, removal of water within tank 64 will lower the level thereof, and as the capacity of the tank 64 is considerably greater than the volume required to recharge pressure storage tank 56' little transfer of water occurs between tank 62 and tank 64 during operation of pump 52'. Once the level within tank 64 has been lowered, the water will slowly flow from tank 62 to tank 64 through conduit 74, and the new water introduced into tank 64 will be ozonated to substantially reduce the hydrogen sulfide therein.

As the level within tank 62 lowers due to transfer of water to tank 64, the float operated valve 18' will replace the water within tank 62 and such raw water will immediately begin to be air-stripped by the air rising from diffuser 82. Thus, the water is usually treated in "batches" as with the previously described embodiment, and the continuous water treatment intermediate cycles of pump 52' will provide water substantially free of hydrogen sulfide for domestic use.

The accumulation of ozone immediately below the covers 66 and 68 will provide a disinfection ozone cap at the water level of the tanks and as the tanks are vented to the atmosphere low air vapor characteristics exist which facilitate the removal of soluble gases by air-stripping. The two tank embodiment of FIG. 3 is particularly advantageous in those situations where relatively large amounts of treated water are required over a relatively short duration, such as due to heavy laundry use.

It will be appreciated that a drain, not shown, will usually be provided in tank 62, and conventional drainage fittings may be associated with both tanks for maintenance purposes. In both described embodiments, the removal of the treated water from the lower region of the chamber wherein vortexing occurs will cause accumulated sediment to be recirculated, and also supplied to the water system. However, as filter means are normally used in the water system the sediment is filtered, and disposed of during the filter backwash cycle.

It will be appreciated that the method of the invention permits very high concentrations of hydrogen sulfide to be removed from well water in domestic systems, and the combination of air-stripping, ozonization and dilution permits a rapid reduction of the hydrogen sulfide present to be achieved. Control of the rate of transfer of air-stripped water from the raw water chamber to the ozonated water within the treated chamber controls the rate of contamination of the treated water chamber permitting effective ozonization to achieve the maximum hydrogen sulfide removal, and the continuous treatment of the water within both chambers will produce adequate available treated water for domestic use in tanks of reasonable capacity readily installable in homes.

It is appreciated that various modifications to the inventive concepts may be apparent to those skilled in the art without departing from the spirit and scope of the invention.

I claim:

1. The method of treating water utilized by a water system pressurized by an intermittingly operated pump to remove high concentrates of hydrogen sulfide, the water system having a known average volume requirement within a predetermined interval, comprising the steps of:

(a) storing a volume of water greater than that required during the known requirement interval within first and second chambers, (b) air-stripping the stored water within the first chamber by aeration to rapidly reduce the high hydrogen sulfide concentrate, (c) transferring the air-stripped water to the second chamber at a rate determined by the pump during normal water usage, (d) intermixing ozone with the air-stripped water within the second chamber to remove low concentrates of hydrogen sulfide from the water, and (e) removing water from the second chamber by the pump during normal water usage.

2. The method of removing high concentrates of hydrogen sulfide from bulk water as in claim 1 including the step of creating a vortex within the second chamber to stratify the water therein.

3. The method of removing high concentrates of hydrogen sulfide from bulk water wherein the water is retained within a vented reservoir having an upper chamber and a lower chamber separated by a dilution plate having small air and water previous orifices wherein raw water is introduced into the upper chamber and treated water is removed from the lower chamber comprising the steps of introducing air and ozone into the lower chamber to ozonate the water within the lower chamber, air-stripping the water within the upper chamber by air passing through the dilution plate, and permitting water to slowly flow from the upper chamber to the lower chamber through the dilution plate as water is withdrawn from the lower chamber.

4. The method of removing high concentrates of hydrogen sulfide from bulk water as in claim 3, including the step of creating a vortex within the lower chamber to stratify the water therein.

5. A water purification system particularly suitable for removing high concentrations of hydrogen sulfide from water comprising, in combination, a first water receiving chamber adapted to receive untreated water, an untreated water inlet communicating with said first chamber, a float valve connected to said inlet maintaining a predetermined amount of water within said first chamber, a second water receiving chamber adjacent said first chamber, restrictive dilution control means establishing communication between said first and second chambers controlling the rate of flow of water to said second chamber from said first chamber, said first and second chambers being vented to the atmosphere and each having a lower region, a single ozone generator and an air compressor supplying air and ozone to the lower region of both of said chambers for air-stripping and ozonization of the water within said chambers, and a treated water outlet communicating with the lower region of said second chamber.

6. In a water purification system as in claim 5, water recirculating means communicating with said second chamber recirculating the water therein to produce a vortex within said second chamber.

7. In a water purification system as in claim 6, said recirculating means comprising a pump having an inlet communicating with said second chamber outlet and an outlet communicating with said second chamber and tangentially related thereto.

8. In a water purification system as in claim 7, said second chamber outlet being located at the center of the vortex produced within said second chamber.

9. In a water purification system as in claim 6, said recirculating means including magnet means exposing recirculated water passing through said pump to a magnetic field.

10. A water purification system particularly suitable for removing high concentrations of hydrogen sulfide from water comprising, in combination, a water tank having an upper region and a lower region, a dilution plate within said tank separating said upper and lower regions defining tank upper and lower chambers, an untreated water inlet communicating with said upper chamber, means controlling the flow of water through said inlet into said upper chamber maintaining a predetermined volume of water within said tank and said chambers, a treated water outlet communicating with said lower chamber at the lower region thereof, a vent venting said upper chamber, means supplying ozone and compressed air to said lower chamber at the lower region thereof, said dilution plate including a plurality of small orifices to permit air flow upwardly therethrough and water flow downwardly therethrough whereby air passes upwardly through said upper chamber to air strip the water within said upper chamber and water is ozonated within said lower chamber and hydrogen sulfide concentrations within water passing from said upper chamber into said lower chamber upon withdrawal of water from said outlet are diluted by water within said lower chamber.

11. In a water purification system as in claim 10, a pump having a pressure tank communicating with said treated water outlet periodically withdrawing a predetermined volume of water from said lower chamber, said means controlling the flow of water through said inlet including a float operated valve connected to said inlet maintaining a substantially constant water level within said upper chamber.

12. In a water purification system as in claim 10, water recirculating means communicating with said lower chamber recirculating the water therein to produce a vortex within said lower chamber, comprising a pump having an inlet communicating with said lower chamber and an outlet communicating with said lower chamber and tangentially related thereto.

13. In a water purification system as in claim 12, said treated water outlet being located at the lowermost region of said lower chamber at the center of the vortex within said lower chamber.

14. In a water purification system as in claim 12, said recirculating means including a magnet means exposing recirculated water passing through said pump to a magnetic field.

* * * * *